Figure 1:
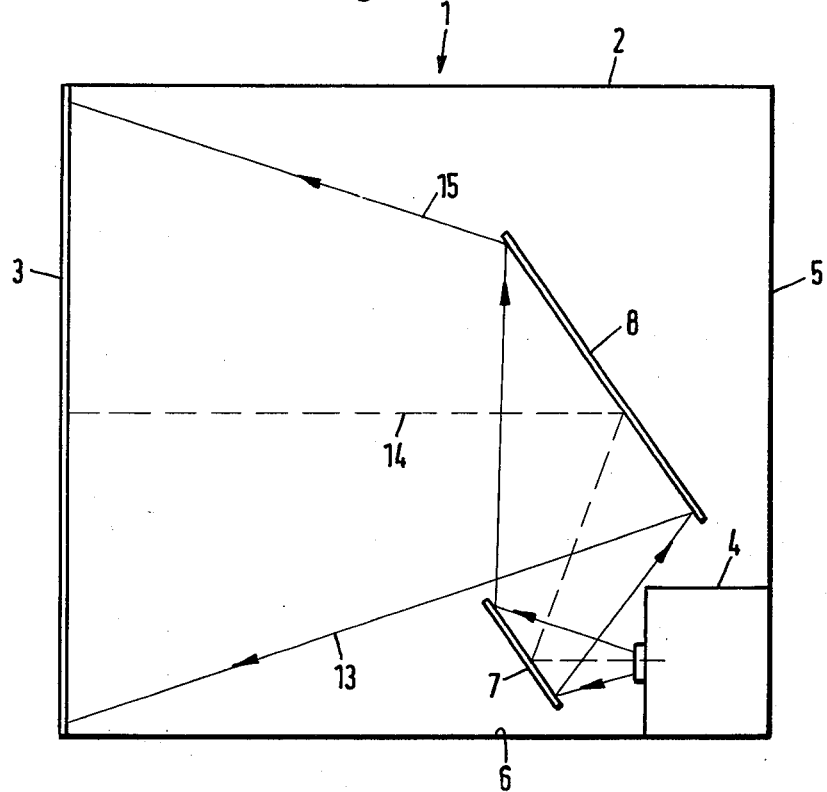

United States Patent [19]

Reinhard

[11] 4,257,694
[45] Mar. 24, 1981

[54] PROJECTION SYSTEM

[75] Inventor: Freisleben Reinhard, Pöring, Fed. Rep. of Germany

[73] Assignee: Soding TV GmbH & Co. Bild & Ton International, Fed. Rep. of Germany

[21] Appl. No.: 7,945

[22] Filed: Jan. 31, 1979

[30] Foreign Application Priority Data

Feb. 3, 1978 [DE] Fed. Rep. of Germany ....... 2804704

[51] Int. Cl.³ ....................... G03B 21/10; G03B 21/28
[52] U.S. Cl. .................................................. 353/78
[58] Field of Search ...................... 353/109, 78, 99, 69, 353/87, 70; 352/78 R, 72

[56] References Cited

U.S. PATENT DOCUMENTS

| | | | |
|---|---|---|---|
| 1,253,220 | 1/1918 | Dumars | 353/43 X |
| 1,879,600 | 9/1932 | Burchett | 353/78 X |
| 1,896,928 | 2/1933 | White et al. | 353/65 |
| 1,952,522 | 3/1934 | Warmisham | 353/70 |
| 2,100,008 | 11/1937 | Stephens | 353/43 |
| 2,543,561 | 2/1951 | Tracy | 353/78 |
| 2,763,178 | 9/1956 | Gottschalk | 353/78 X |
| 3,507,571 | 4/1970 | White | 353/70 X |
| 3,924,941 | 12/1975 | Smith et al. | 352/78 R |
| 3,963,337 | 6/1976 | Lundberg | 353/70 |
| 4,037,951 | 7/1977 | Aoki | 352/78 R |

FOREIGN PATENT DOCUMENTS

| | | | |
|---|---|---|---|
| 6846 | of 1907 | United Kingdom | 352/127 |
| 297371 | 9/1928 | United Kingdom | 353/10 |
| 389399 | 3/1933 | United Kingdom | 352/127 |

*Primary Examiner*—Harry N. Haroian
*Attorney, Agent, or Firm*—Lerner, David, Littenberg & Samuel

[57] ABSTRACT

The invention relates to a projection system for diapositive film strips, comprising an essentially cubic projection box, the front side of which comprises a ground glass plate as screen and in the interior of which a projector and two reflecting mirrors are arranged to project the projecting beam exiting from the projector on to the ground glass plate, characterized in that the illumination means of the projector generating the projecting light is disposed such that its optical axis passing through the optical center of the objective forms an acute angle together with the optical axis of the objective and the principal ray of the projecting beam exiting from the projector is inclined toward that wall of the projection box at which the projector is located.

14 Claims, 6 Drawing Figures

PROJECTION SYSTEM

A PROJECTION SYSTEM

The invention relates to a projection means for diapositive film strips, comprising an essentially cubic projection box, the front side of which comprises a ground glass plate as screen and in the interior of which a projector and two reflecting mirrors are arranged to project the projecting beam exiting from the projector on to the ground glass plate.

Projection means in the form of projection boxes are used above all for purposes of advertising, information and training, whenever an apparatus is needed which can be put up anywhere, especially also in rooms which are lit. Often a great number of such projection boxes are composed to build an entire projection wall.

It is an essential disadvantage of these known projection means that they are either very deep if the ground glass plate is to make up the entire front wall of the box or that only a relatively small area of the front wall of the box can be designed as ground glass plate if a flat projection box is desired. This cannot be avoided readily with normal projection objectives although the projection path is extended by the two reflecting mirrors disposed in the interior of the box.

It is the object of the invention to provide a projection means of the kind defined in greter detail in the preamble of claim 1 and characterized by a small depth and a large projected picture.

This object is met, in accordance with the invention, in that the illumination means of the projector generating the projecting light is disposed such that its optical axis passing through the optical center of the objective forms an acute angle together with the optical axis of the objective and the principal ray of the projecting beam exiting from the projector is inclined toward that wall of the projection box at which the projector is located.

As the optical axis of the illumination means generating the projection light is inclined in accordance with the invention, the principal ray of the projecting beam issuing from the projector does not exit parallel to that wall at which the projector is arranged but instead inclined toward said wall so that the principal ray impinges on the ground glass plate at an inclination of the same angle rather than vertically to the ground glass plate, as is the case with conventional projection means. This affords much better utilization of the space inside the box, in other words the depth of the box may be much smaller at the same length of the projection path between the objective and the ground glass plate. This makes the projection means less expensive and easier to handle without causing any deterioration in quality of the projected picture. The inclined impingement of the main ray on the ground glass plate does not cause any distortion or haziness of the projected picture since the ground glass plate and the plane of the film gate means still are disposed parallel to each other and vertical to the optical axis of the objective. In principle the situation remains the same if a third reflecting mirror reflecting the beam path by 90° is dipsosed either in front of or behind the objective, as is the case with an advantageous further development of the invention. The inclination of the optical axis of the illumination means provided by the invention permits a reduction of the depth of the projection box by up to approximately 30% at the same size of the ground glass plate.

Preferably the angle $\alpha$ correspnds to the difference by which the angular field of the objective is greater than half the angular aperture of the condenser system. In this manner the angular field of the objective is exploited fully to obtain the maximum value of the angle of inclination and thus the smallest possible depth of the projection box.

As already mentioned, a third reflecting mirror reflecting the projecting beam path by 90° may be disposed in the projecting beam path inside the projector either in front of or behind the objective so as to stand upright in the box and be disposed vertical to that wall at which the projector is located. In this manner the optical axis at least of the illumination means of the projector generating the projecting light extends parallel to the rear wall of the projector. This avoids the necessity of making the box extremely deep just because of the length of the projector.

In accordance with one of the features of the present invention, the optical axes of the illumination means and of the objective extend parallel to the rear wall of the projection box. This means that the entire projector is disposed transversely at the rear wall and at one of the adjacent walls of the projection box, this arrangement permitting the projection box to have only minimum depth.

If a projection box having this arrangement of the projector is provided for projecting a plurality of disapositives in uninterrupted sequence, such as for purposes of advertising or information, it is convenient to have an endless diapositive film strip guide path formed in the projector and including the objective and the third reflecting mirror. As the projector is arranged transversely such an endless guide path may be relatively long without having any influence on the depth of the projection box. For instance, an endless diapositive film strip may be inserted into the guide path for continuous or stepwise revolution.

Preferably the guide path is formed by the film gate means and a plurality of guide rolls, one of which is adapted to be driven. Conveniently, another one is designed as a displaceable tension roll and is displaceable into the inner space defined by the endless guide path. This permits not only an increase of the useful length of the endless strip but also the use of endless strips having different lengths.

As the tension roll permits tight tensioning of the endless film strip, it is no longer necessary to provide moveable and resilient elements at the film gate means in order to press the diapositive film strip exactly flat, as with conventional systems. Instead, the film gate means may consist of a rigid skid arrangement without affecting the quality of the picture.

The plane position of that section of the endless film strip which is disposed in the film gate means is enhanced still further by the fact that the skids of the film gate means describe a 90° arc directly in front of and behind the picture gate. In this manner any curving of the film strip in the area of the film gate is positively prevented.

In further development of the invention and to increase the light intensity the double-lens condenser system which is customary with conventional projectors is replaced by a three-lens condenser system of short focal length in combination with an objective likewise having a short focal length.

In accordance with a particular modification of the invention the projector is designed as a unit adapted to be inserted into the projection box. This has the advantage that the projector can be used also for normal screen projection.

Furthermore, of the two parallel reflecting mirrors the one at the projector end conveniently is installed in the projector so as to render the projection box simpler. If desired, this reflecting mirror may be removable if the projector is to be useful for normal screen projection as well.

Figure 2:
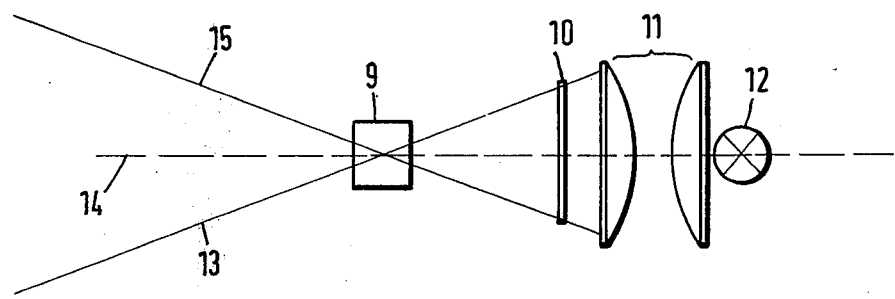
Figure 3:
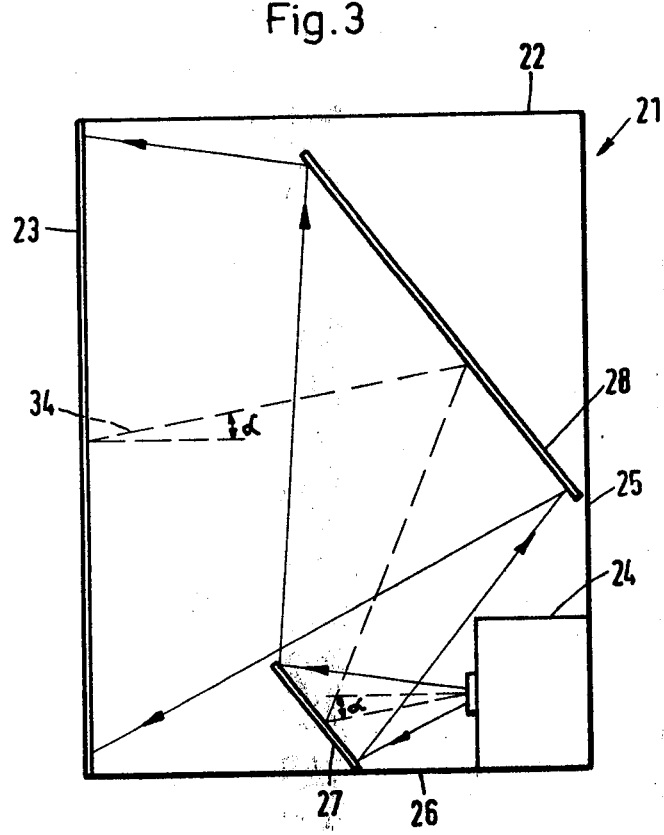
Figure 4:
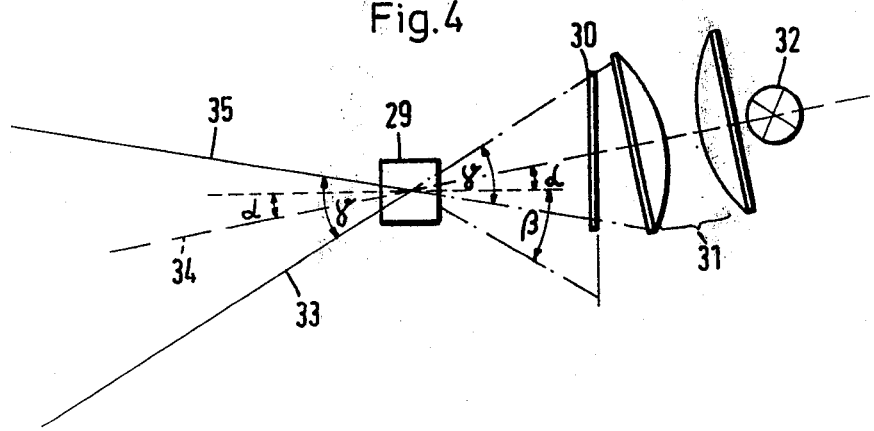
Figure 5:
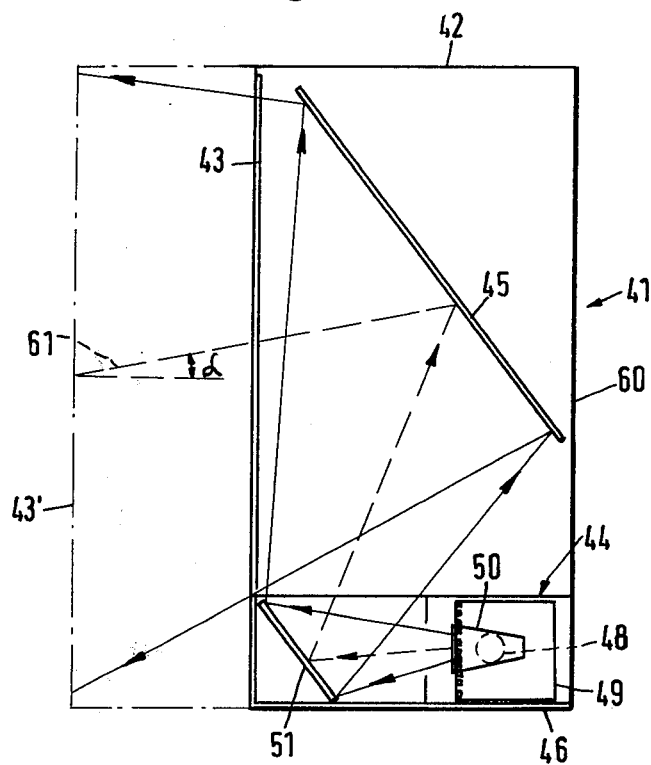
Figure 6:
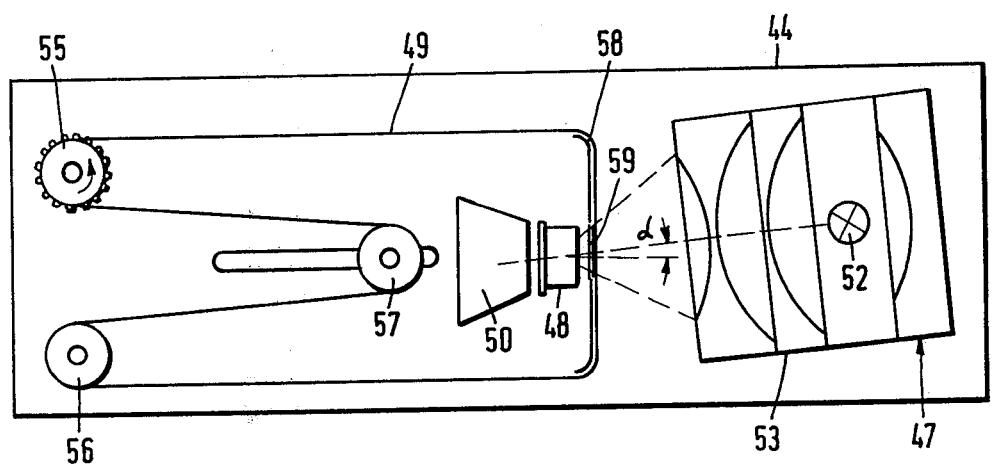

The invention will be described further, by way of example, with reference to the accompanying drawings, in which:

FIG. 1 is a sectional elevation of a conventional projection means,

FIG. 2 is a diagrammatic presentation of the optical system of the projector installed in the projection means according to FIG. 1, FIG. 3 is a sectional elevation of a projection means according to the invention, FIG. 4 is a diagrammatic presentation of the optical system of the projector installed in the projection means according to FIG. 3, FIG. 5 is a sectional elevation of another embodiment of a projection means according to the invention, FIG. 6 is a diagrammatic presentation of the projector of the projection means according to FIG. 5, with the rear wall open.

The conventional projection means 1 illustrated in FIGS. 1 and 2 includes a housing embodied by a cubic projection box 2 the front side of which comprises a ground glass plate 3 serving as screen. A projector 4 is located in the interior of the projection box 2 and fixed in the middle of the rear wall 5 of the projection box 2 and at the bottom wall 6 in such manner that the principal ray 14 of the bundle of rays or beam issuing from the projector is projected at right angles to the rear wall 5. Two parallel reflecting mirrors 7 and 8 are mounted by fixing means (not shown) inside the projection box 2 so as to reflect the projecting rays on to the ground glass plate 3, the principal ray 14 impinging vertically on the ground glass plate 3.

FIG. 2 shows the structural principle of the projector 4, on an enlarged scale. An objective 9, a film gate means (not shown) for a diapositive or slide film strip 10, and an illumination means generating the projecting light and consisting of a double-lens condenser 11 and a lamp 12 are arranged one behind the other in the projector 4. The axes of the objective 9 and of the condenser 11 are aligned and extend parallel to the bottom wall 6. The plane of the film strip 10 through which the light is to be transmitted is disposed perpendicularly to these optical axes.

The divergent bundle of rays exiting from the objective 9 and having a lower marginal ray designated 13, a principal ray designated 14, and an upper marginal ray designated 15, as seen in FIGS. 1 and 2, is reflected by the first reflecting mirror 7 which is disposed at an angle with respect to the principal ray 14 running parallel to the bottom wall 6, and then directed to the second reflecting mirror 8 which is arranged parallel to the first one and reflects the bundle of rays towards the ground glass plate 3. The inclination of the reflecting mirrors 7 and 8 relative to the bottom wall 6 is such that the principal ray 14 will impinge on the center and the marginal rays 13 and 15 on the edges of the ground glass plate 3.

A first embodiment of the invention is shown in FIGS. 3 and 4. The projection means 21 shown is designed like the conventional projection means 1 described with reference to FIGS. 1 and 2 and comprise a projection box 22, a ground glass plate 23 designed as screen, a projector 24 disposed in the middle at the rear wall 25 and at the bottom wall 26 of the projection box 22, and two reflecting mirrors 27 and 28 disposed parallel to each other.

Similar to the conventional projector 4, the projector 24 is composed of an objective 29, a film gate means (not shown) for the diapositive or slide film strip 30, and an illumination means consisting of a double-lens condenser 31 and a lamp 32.

Other than with the conventional projection means 1 the illumination means is mounted turned in an upward direction so that the optical axis of the illumination means 31, 32 of the projection means 21 according to the invention passing through the optical center of the objective 29 forms an acute angle $\alpha$ with the optical axis of the objective 29. In spite of this arrangement the plane of the film strip 30 through which the light is to shine is maintained in vertical orientation with respect to the optical axis of the objective 29. Likewise maintained is the orientation of the optical axis of the objective 29 parallel to the bottom wall 26. The principal ray 34 of the beam, defined according to FIG. 4 by the marginal rays 33 and 35, thus passes through the objective 29 at an inclination corresponding to the angle $\alpha$ so that it does not exit from the objective 29 parallel with the bottom wall 26 but instead inclined at the angle $\alpha$ toward the bottom wall. The two parallel reflecting mirrors 27 and 28 are mounted so as to be offset correspondingly. By virtue of the parallel arrangement of the two reflecting mirrors 27 and 28 the principal ray 34 no longer impinges vertically on the ground glass plate 23 but likewise at an inclination corresponding to the angle $\alpha$ with respect to a line normal to the ground glass plate. In this manner it is warranted that the plane of the film strip through which light is transmitted and the picture plane (ground glass plate 23) are disposed parallel to each other and vertically to the optical axis of the objective. This guarantees distortionless imaging with sharp edges. Comparing FIGS. 1 and 3 it is quite evident that the inclined arrangement of the illumination means affords much better utilization of the interior of the projection box 22 so that the depth of the projection box can be made smaller at the same length of the optical path between the objective and the ground glass plate.

The maximum angle of inclination of the illumination means 31, 32 is limited by the fact that the bundle of rays exiting from the illumination means and projected through the film strip must not leave the imaging cone of the objective. Thus the maximum angle of inclination $\alpha$ corresponds to the difference by which the angular field $\beta$ of the objective 29 is greater than half the angular aperture $\gamma$ of the condenser 31. Furthermore, of course, the film gate means for the film strip is displaced upwardly, as compared to the arrangement of FIG. 2, in accordance with the angle of inclination $\alpha$ without, however, being swung or turned.

FIGS. 5 and 6 show another embodiment of the projection means according to the invention, designated 41. A projector 44 which is as deep and as wide as the projection box 42 is adapted to be inserted into the lower part of the projection box 42. If it is less wide than the projection box, it is located in the middle of the same. As clearly shown in FIG. 5, the first of the two parallel mirrors, namely mirror 51 is mounted in the projector. The second mirror 45, on the other hand, is mounted in the interior of the box such that it will reflect the projecting light on to the ground glass plate 43 which extends from the top edge of the projection box 42 down to the lower edge of the projector 44.

As indicated by dash-dot lines in FIG. 5, it is also possible to design the entire front of the projection box 42 as a ground glass plate 43'. In that event, of course, the depth of the box is greater.

FIG. 6 shows the projector of the projection means 41 diagrammatically as it is seen when looking at the rear wall 60 of the projection box 42. The optical axes of the illumination means 47 and of the objective 48 extend parallel to the rear wall 60 of the projection box 42. This arrangement of the projector 44, while providing a very flat projection box 42, requires a third reflecting mirror 50 to deflect the bundle of rays existing from the objective 48 by 90°. For this purpose it is disposed vertically with respect to the bottom wall 46 of the projection box 42. A film gate means 58 whose plane is disposed vertically with respect to the optical axis of the objective 48 is provided between the illumination means 47 and the objective 48.

As with the embodiment shown in FIGS. 3 and 4, the optical axis of the illumination means 47 of this embodiment of the invention is also inclined at an angle $\alpha$ with respect to the optical axis of the objective 48. Both axes intersect in the optical center of the objective 48 and lie in a plane parallel to the rear wall 60 of the projection box 42. As the illumination means 47 is turned upwardly by the angle $\alpha$, the principal ray 61 of the bundle of rays exiting from the objective 48 is inclined in a downward direction toward the bottom wall 46, as clearly shown in FIGS. 5 and 6.

The illumination means 47 consists of a lamp 52 and a three-lens condenser 53 of short focal length. The objective 48, too, has a relatively short focal length.

Together with three guide rolls 55, 56, and 57 the film gate means 58 forms a guide path for an endless diapositive film strip 49. Guide roll 57 is supported for displacement in the direction of the optical axis of the objective 48 and spring-biased toward the objective 48 so that the endless film strip 49 is always kept under tension. The drive is effected through the driven guide roll 55 engaging a perforation of the endless film strip. The drive may either be continuous or stepwise. Guide roll 57 serving as a tension roller is displaceable by such an extent that it is possible to use film strips which vary somewhat in length. Yet the guide roll 57 may also be fixed if the length of the film strips used always is the same.

The film gate means 58 consists of a rigid guide or skid arrangement with a picture gate 59, the skids at either side of the picture gate 59 describing a 90° arc. This deflection of the film strip directly before and after passing the picture gate warrants an excellent plane position of the film strip in the area of the picture gate 59.

The projector 44 with its two built-in reflecting mirrors 50 and 51 is designed as a unit to be pushed into and out of the projection box 42 through the rear wall 60. Thus the projector 44 is insertable also into other projection boxes which may vary in size. Upon withdrawal from the projection box 42 and removal of the reflecting mirror 51 the projector 44 can be used also for normal screen projection, Furthermore, if desired the projector 44 may be furnished with an adjusting means, not shown, to select the desired value for the angle $\alpha$ by which the optical axis of the illumination means is inclined with respect to the optical axis of the objective. Instead of being arranged at the bottom wall the projector, of course, may also be mounted on the top wall of the projection box. Finally, the exchange of the film strip is facilitated by the guide rolls 55, 56 and 57 as well as the film gate means 58 being mounted on a common carrier, not shown in the drawing. This carrier is insertable into the projector 44 in the manner of a cassette.

For the sake of clarity of FIGS. 1 to 6 unimportant details of the installation of the objective, condenser, and lamp are not shown. Likewise not included in the illustration, for example, is a reflector or the like for the lamp and a ventilation means for the projector.

What we claim is:

1. A projection system having a compressed optical path for projecting diapositive film strips comprising:

a projection box having a plurality of walls including one wall in the form of a ground glass plate and at least another wall transversely disposed to said one wall, said one wall in the form of a ground glass plate acting as a screen for rear view projections;

projector means for providing a projection beam having a principal ray, said projector means being disposed adjacent to said another wall at a location thereon remote from said one wall and including illumination means for generating said projecting beam and an objective having a relatively short focal length for focusing an image being projected upon said one wall, said illumination means having an optical axis along which said principal ray is produced and said objective having an optical axis, an optical center and an imaging cone for incoming radiation provided by said illumination means, said objective having said optical axis thereof parallelly disposed to said another wall and transversely disposed to said one wall and said illumination means being positioned having said optical axis thereof being inclined toward said another wall in a direction in which said principal ray is produced and passing through said optical center of said objective to form an acute angle with said optical axis of said objective and said another wall, said acute angle being limited to enable said projecting beam from said illumination means to be substantially within said imaging cone for incoming radiation; and first and second reflecting mirrors being disposed within said projection box and arranged to project said projecting beam upon said one wall, said first and second reflecting means being substantially parallelly disposed.

2. The projector system according to claim 1, wherein said illumination means comprises a condenser system having an angular aperture, said objective exhibiting an angular field and said acute angle corresponding to the difference by which the angular field of the objective is greater than half of the angular aperture of the condenser system.

3. The projection system according to claim 1, further comprising a third reflecting mirror disposed to deflect the projecting beam path by 90° arranged within the projector box to reflect the projecting beam by 90°.

4. The projection system according to claim 3, wherein said third reflecting mirror is disposed behind the objective in the light transmitting direction of said projecting beam.

5. The projection system according to claim 4, further comprising a guide path for an endless diapositive film strip disposed in said projector means, said guide path including the objective and the third reflecting mirror.

6. The projection system according to claim 5, wherein the guide path comprises a film gate means, and a plurality of guide rolls, one of said guide rolls being driven.

7. The projection system according to claim 6, wherein another one of the guide rolls is a displaceable tension roll and is displaceable into the interior of the guide path.

8. The projection system according to claim 6 wherein the film gate means comprises a rigid skid arrangement.

9. The projection system according to claim 8, wherein the rigid skid arrangement has a 90° arc directly in front of and behind the film gate means with respect to the direction of travel of said endless film strip.

10. The projection system according to claim 1, wherein said illumination means comprises a three-lens condenser system having a short focal length.

11. The projection system according to claim 1, wherein the projector comprises a unit to be inserted into the projection box.

12. The projection system according to claim 11, wherein one of the two reflecting mirrors is disposed in the projector.

13. The projection system according to claim 5, wherein the guide path comprises interconnected elements forming a cassette which is insertable into the projector.

14. The projection system according to claim 1 wherein said principal ray of said projecting beam additionally forms said acute angle with a plane parallel to said another wall passing through said ground glass plate at a point where said principal ray intersects said ground glass plate.

* * * * *